(12) United States Patent
Ikeda et al.

(10) Patent No.: US 7,219,926 B2
(45) Date of Patent: May 22, 2007

(54) STEERING DEVICE

(75) Inventors: Shuhei Ikeda, Maebashi (JP); Kenji Sato, Maebashi (JP)

(73) Assignee: NSK Ltd., Tokyo (JP)

( * ) Notice: Subject to any disclaimer, the term of this patent is extended or adjusted under 35 U.S.C. 154(b) by 4 days.

(21) Appl. No.: 10/501,542

(22) PCT Filed: Oct. 15, 2002

(86) PCT No.: PCT/JP02/10648

§ 371 (c)(1),
(2), (4) Date: Jul. 16, 2004

(87) PCT Pub. No.: WO03/059718

PCT Pub. Date: Jul. 24, 2003

(65) Prior Publication Data
US 2005/0104353 A1    May 19, 2005

(30) Foreign Application Priority Data

Jan. 17, 2002 (JP) ............................. 2002-008505
Aug. 6, 2002 (JP) ............................. 2002-228194

(51) Int. Cl.
*B62D 1/18* (2006.01)
(52) U.S. Cl. ........................................ 280/775; 74/493
(58) Field of Classification Search ................. 280/775; 74/493

See application file for complete search history.

(56) References Cited

U.S. PATENT DOCUMENTS

| 5,306,032 | A | * | 4/1994 | Hoblingre et al. | ........... 280/775 |
| 5,394,767 | A | * | 3/1995 | Hoblingre et al. | ............. 74/493 |
| 5,605,351 | A | * | 2/1997 | Higashino | .................... 280/775 |
| 5,607,184 | A | * | 3/1997 | Barton | ........................ 280/775 |
| 5,634,662 | A |   | 6/1997 | Asayama | ..................... 280/777 |
| 5,730,465 | A | * | 3/1998 | Barton et al. | ............... 280/775 |
| 5,769,453 | A | * | 6/1998 | Peitsmeier et al. | ......... 280/775 |
| 5,788,277 | A | * | 8/1998 | Hibino et al. | ............... 280/775 |
| 5,845,936 | A | * | 12/1998 | Higashino | .................... 280/775 |

(Continued)

FOREIGN PATENT DOCUMENTS

FR    2 787 842    6/2000

(Continued)

*Primary Examiner*—Paul N. Dickson
*Assistant Examiner*—Barry Gooden, Jr.
(74) *Attorney, Agent, or Firm*—Miles & Stockbridge, P.C.

(57) ABSTRACT

An outer column (21) is held between a tension member (13) and brackets (12) by operating a lever (L), thereby making it possible to block displacements of fixing members (16, 17) along tilt grooves (12a). An inner column (11) is held to the brackets (12) through the outer column (21), whereby the displacements of the fixing members (16, 17) along telescopic grooves (11a) can be blocked. A steering shaft (S) can be thereby fixed in a tilting direction and a telescoping direction. The brackets (12) apply a pressing force to the inner column (11) through flange portions (21c, 21d) of the outer column (21) by operating the lever (L), and the inner column (11) receives the pressing force in a direction opposite to a direction in which the tension member (13) approaches. As rigidities of the pair of brackets (12) are approximately equal, a central position of the inner column (11) can be therefore kept substantially fixed. Hence, an axis deviation of the steering shaft (S) can be effectively restrained.

10 Claims, 16 Drawing Sheets

U.S. PATENT DOCUMENTS

| | | | |
|---|---|---|---|
| 5,915,726 A * | 6/1999 | Hibino et al. | 280/775 |
| 6,282,978 B1 * | 9/2001 | Kurita | 74/493 |
| 6,450,531 B1 * | 9/2002 | Rinker et al. | 280/775 |
| 6,467,807 B2 * | 10/2002 | Ikeda et al. | 280/775 |
| 6,623,036 B2 * | 9/2003 | Yamamura et al. | 74/493 |
| 6,637,771 B2 * | 10/2003 | Yoshimoto | 280/775 |
| 6,902,192 B2 * | 6/2005 | Sato et al. | 280/775 |
| 2002/0024208 A1 * | 2/2002 | Fujiu et al. | 280/775 |
| 2002/0026848 A1 * | 3/2002 | Kurita | 74/493 |
| 2002/0079685 A1 * | 6/2002 | Yoshimoto et al. | 280/775 |
| 2004/0075263 A1 * | 4/2004 | Muller | 280/775 |
| 2004/0113408 A1 * | 6/2004 | Yamamoto et al. | 280/775 |
| 2005/0173914 A1 * | 8/2005 | Sadakata et al. | 280/777 |
| 2005/0236825 A1 * | 10/2005 | Sawada et al. | 280/775 |
| 2006/0097501 A1 * | 5/2006 | Yoshimoto et al. | 280/777 |
| 2006/0125224 A1 * | 6/2006 | Higashino et al. | 280/777 |
| 2006/0151984 A1 * | 7/2006 | Higashino et al. | 280/775 |
| 2006/0163861 A1 * | 7/2006 | Higashino | 280/777 |
| 2006/0170204 A1 * | 8/2006 | Higashino et al. | 280/775 |
| 2006/0207380 A1 * | 9/2006 | Higashino | 74/493 |

FOREIGN PATENT DOCUMENTS

| | | |
|---|---|---|
| GB | 2 295 445 A | 5/1996 |
| GB | 2 298 261 A | 8/1996 |
| JP | 62-74767 | 4/1987 |
| JP | 8-80857 | 3/1996 |
| JP | 10-512826 | 12/1998 |
| JP | 2001-191927 | 7/2001 |
| JP | 2001-347953 | 12/2001 |
| JP | 2001-347953 A | 12/2001 |

* cited by examiner

STEERING DEVICE

TECHNICAL FIELD

The present invention relates to a tilt/telescopic type steering apparatus capable of adjusting a tilt angle of a steering wheel and an axis-directional position thereof, corresponding to a driving posture (position) of a driver.

BACKGROUND ARTS

What is known as a steering apparatus for an automotive vehicle is a tilt/telescopic type steering apparatus capable of adjusting a tilt angle of a steering wheel and an axis-directional position of the steering wheel, corresponding to a physique and a driving posture of a driver.

In this respect, there is an idea that components of the tilt/telescopic type steering apparatus are disposed as close to a steering shaft as possible in order to ensure a space in the vicinity of knees of the driver. Based on this idea, Japanese Patent Application Laid-Open No. 2001-191927 discloses a steering apparatus constructed such that support members disposed within a steering column are interposed between a pair of brackets and are displaced along tilt grooves formed in the brackets or along telescopic grooves formed in the steering column, and this causes the two brackets to get displaced in the same direction, thereby adjusting a tilt angle and an axis-directional displacement of the steering shaft supported rotatably with respect to the steering column.

By the way, according to the prior art described above, the steering column is fixed by pushing one bracket against the steering column via an intermediate member, however, at this time, the other bracket is pushed via the support member, and this might cause an axis deviation of the steering shaft. A rigidity of the other bracket must be increased for preventing the axis deviation, however, this might induce rises both in weight and in costs. On the other hand, a presumable construction is that the two brackets are pressed from both sides against the steering column, however, this construction involves such a laborious operation that the driver must rotate two pieces of levers by hands, and there arises a problem in which the operability declines.

DISCLOSURE OF THE INVENTION

It is an object of the present invention, which was devised in view of the problems inherent in the prior art described above, to provide a steering apparatus capable of preventing an axis deviation of a steering shaft and exhibiting excellency of its operability.

To accomplish the above object, according to the present invention, in a steering apparatus for supporting a steering shaft to which a steering wheel is attached so that the steering shaft is displaceable in an axis-direction, there is provided an improvement characterized by comprising an inner column for supporting the steering shaft rotatably, a pair of brackets fitted to a car body and disposed in positions facing each other with respect to an axis of the steering shaft, a tension member extending between the pair of brackets, two pieces of fixing members for fixing the tension member from outside of the pair of brackets, a displacement causing member, disposed between the bracket and the fixing member, for causing a relative displacement between the bracket and the fixing member, and an outer column held on the car body through a connection between the tension member, the brackets and the fixing members, having a pressing portion of which an outer periphery is brought into contact with both of the pair of brackets due to the relative displacement of the brackets between at least the pair of brackets, and having an inner peripheral surface embracing an outer periphery of the inner column, wherein the pair of brackets interlocking with the tension member gets close to each other due to the displacement caused by the displacement causing member, a pressing force is thereby applied to the inner column via the pressing portion of the outer column, and the inner column maintains its axis-directional position with respect to the brackets through the outer column.

According to the steering apparatus of the present invention, the pair of brackets gets close to each other by dint of the displacement caused by the displacement causing member, with the result that a distance between the brackets decreases. The outer column is thereby held between the tension member and the brackets. Further, the displaced brackets apply a pressing force to the inner column via the pressing portion of the outer column, whereby the inner column is held by the brackets connected to the car body through the outer column. The steering shaft can be therefore fixed in the telescoping direction. Moreover, the pair of brackets is connected to the tension member, and hence, if the two brackets take approximately a symmetrical configuration with respect to the steering shaft interposed therebetween, displaced quantities of the respective brackets are equalized. A central position of the inner column can be thereby kept substantially fixed, so that the axis deviation of the steering shaft can be effectively restrained. Note that a preferable arrangement is that when a line connecting centers of the two fixing members intersects an axis of the inner column (or the steering shaft), the pressing force can be applied uniformly to the inner column. Further, it is preferable that when the outer column formed with slits disposed upwards and downwards with the steering shaft interposed therebetween, the outer column can be made to deform by a smaller force in order to hold the inner column.

Still further, it is preferable that an axis of the steering shaft substantially intersects a line that connects centers of the two fixing members.

Yet further, the pair of brackets is formed with tilt grooves, whereby, for example, the inner column can be tilted together with the outer column.

Moreover, when the outer column includes an integrally-formed car body fitting portion, the inner column can be held on the car body through the outer column.

Furthermore, when part of the inner column is formed with at least one elongate hole extending in an axis-direction, and when an inner peripheral surface of the outer column is formed with a protruded portion engaging with the elongate hole and extending inwards in a radial direction, the inner column can be telescoped (displaced in the axis-direction).

Further, one of the inner column and the outer column is provided with a protruded portion extending in a radial direction, and, when the inner column and the outer column make their displacements in the axis-directions, the protruded portion abuts on the other of the inner column and the outer column and is thus made to function as a telescopic stopper for blocking a further displacement. With this contrivance, the inner column can be restrained from coming off the outer column.

Moreover, when the tension member is constructed of a plurality of parts that can be divided so as to form an annular configuration embracing the outer column, the assembly is facilitated.

BEST MODE FOR CARRYING OUT THE INVENTION

Figure 1:
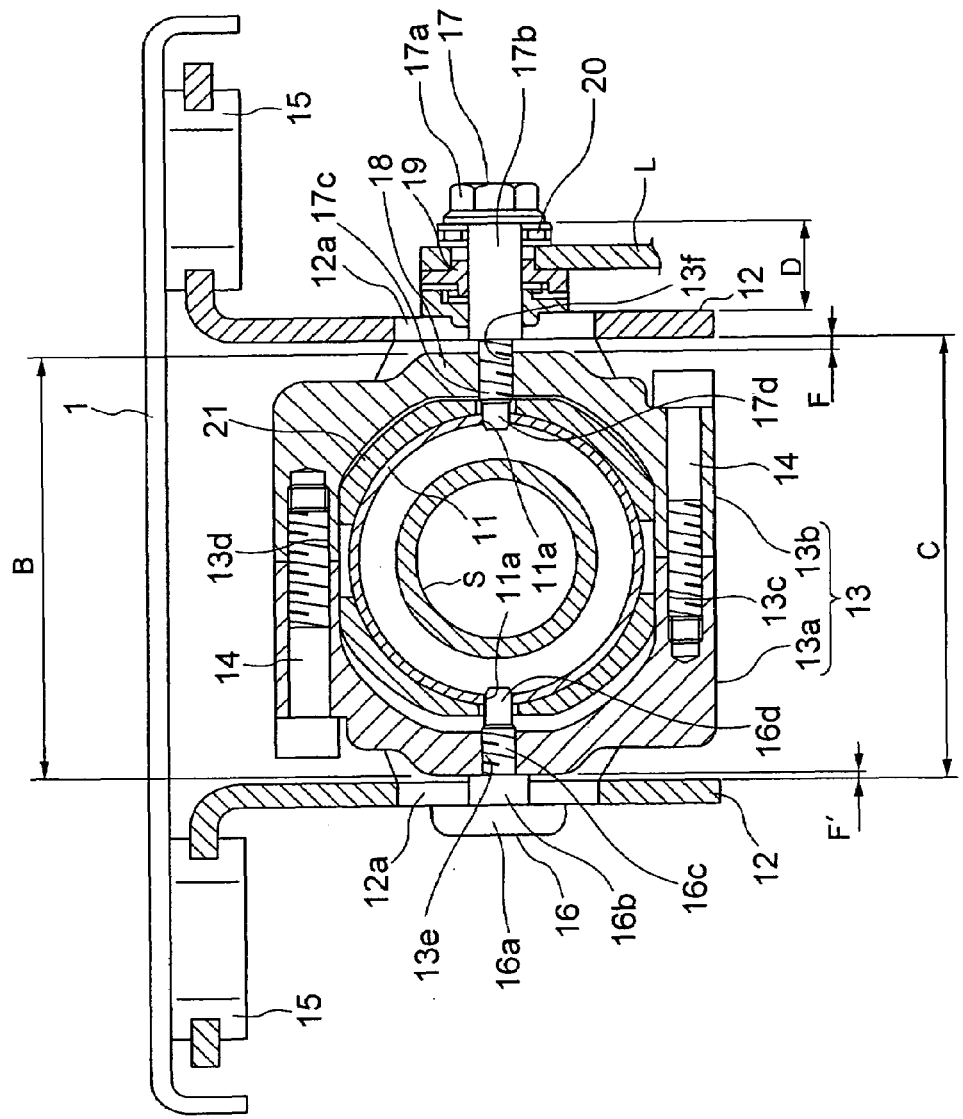
FIG. 1 is a cross-sectional view of a tilt/telescopic type steering apparatus according to a first embodiment of the present invention.
Figure 2:
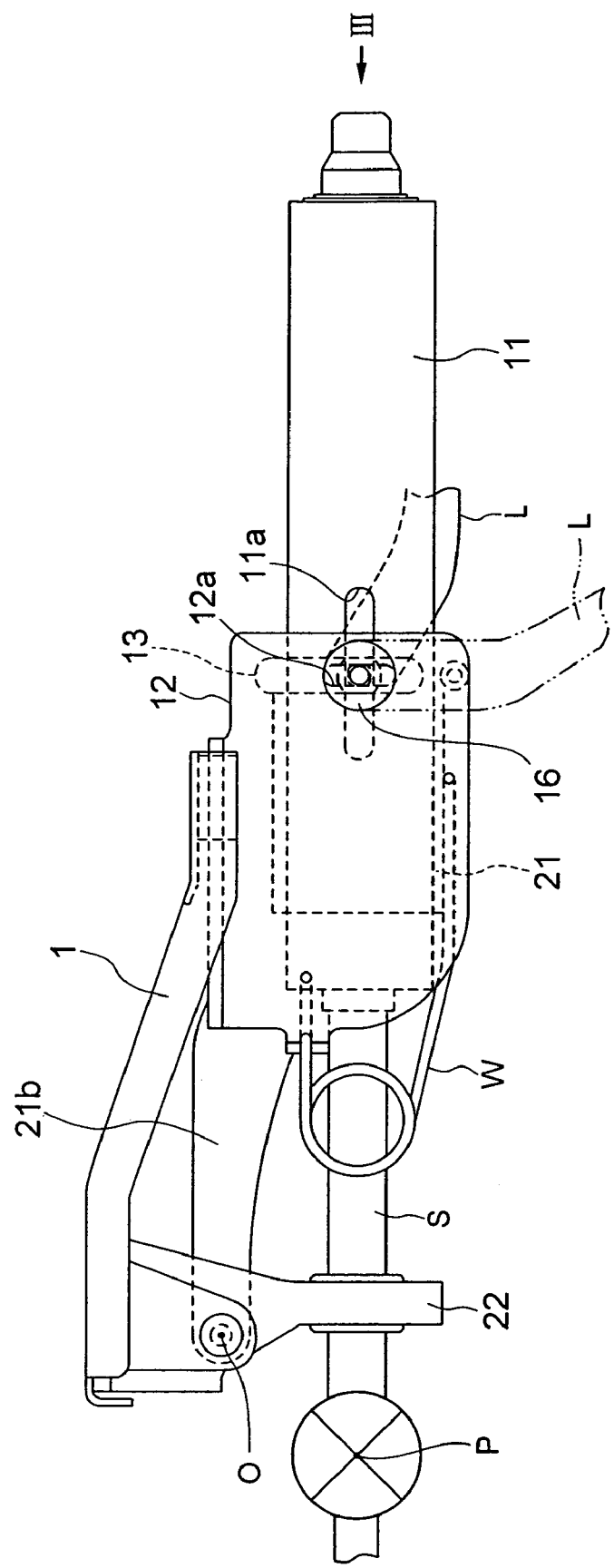
FIG. 2 is a side view of the steering apparatus shown in FIG. 1.
Figure 3:
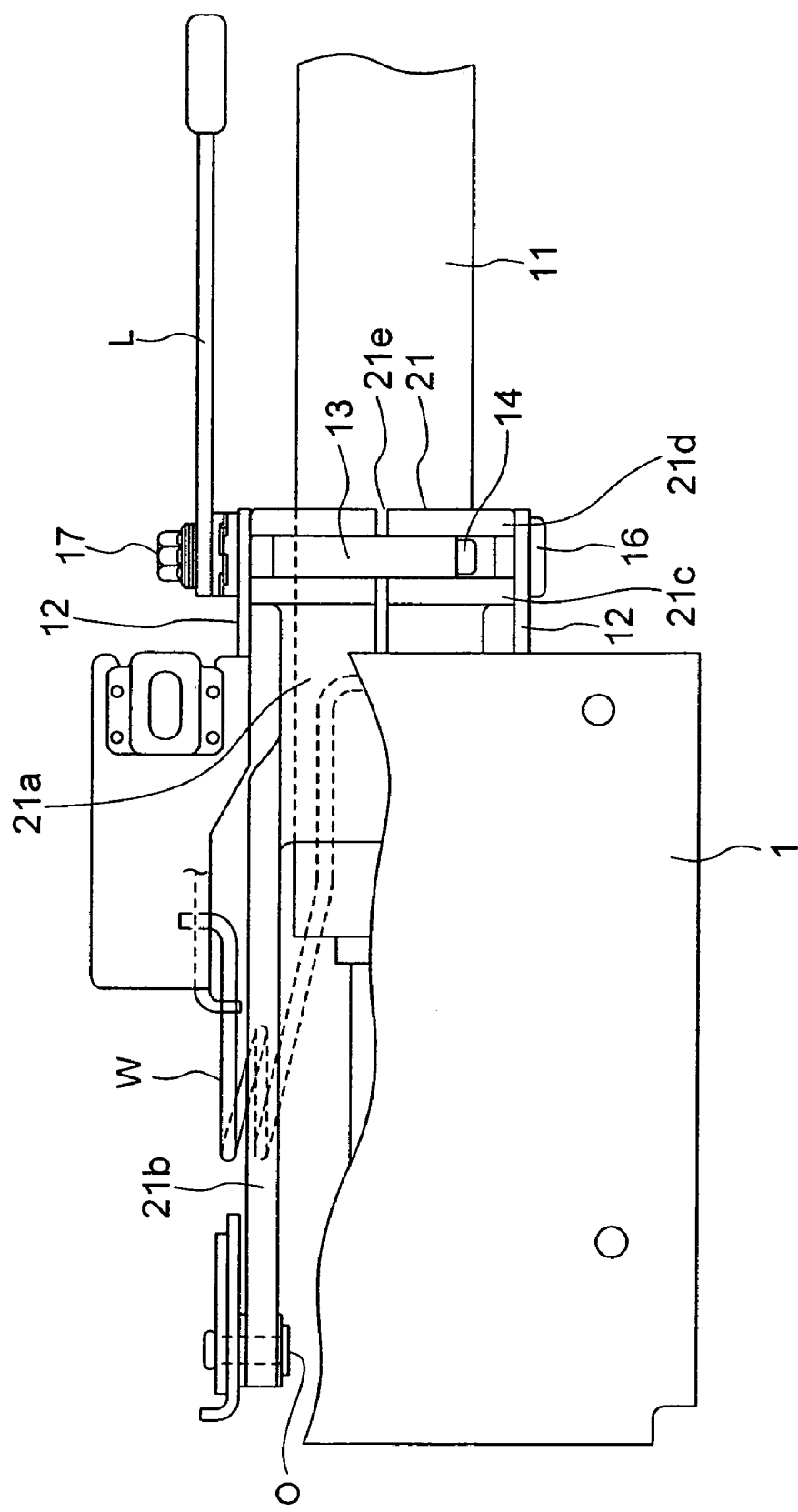
FIG. 3 is a top view of the steering apparatus shown in FIG. 1.
Figure 4:
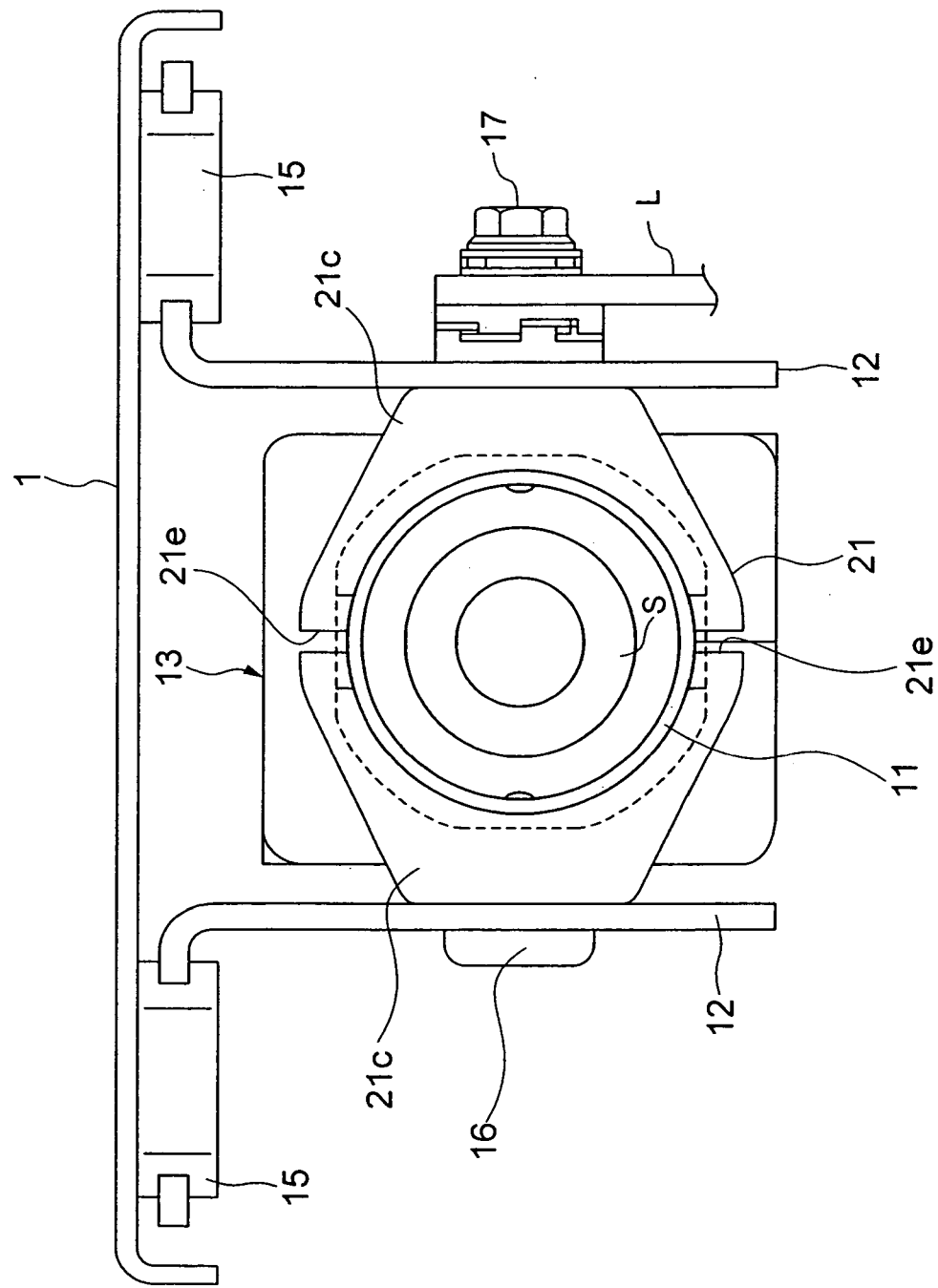
FIG. 4 is a view of the steering apparatus shown in FIG. 2 as viewed in an arrowhead-direction III.

A tilt/telescopic type steering apparatus according to embodiments of the present invention will hereinafter be described with reference to the drawings. FIG. 1 is a cross-sectional view of the tilt/telescopic type steering apparatus according to a first embodiment of the present invention. FIG. 2 is a side view of the steering apparatus shown in FIG. 1. FIG. 3 is a top view of the steering apparatus shown in FIG. 1. FIG. 4 is a view of the steering apparatus shown in FIG. 2 as viewed in an arrowhead-direction III.

Referring to FIG. 1, two pieces of brackets 12 each composed of a plate material bent in an L-shape, are attached through a pair of release capsules 15 to a top plate 1 secured to an unillustrated car body. A plate thickness of each of the brackets 12 is the same, and the brackets 12 take a configuration exhibiting a line symmetry with respect to a perpendicular line. The release capsule 15, upon a secondary collision, functions such that the release capsule 15 gets collapsed when an impact load acts on a steering column towards the front of the vehicle, and gets released together with the car body sided bracket 12 from the car body, thereby enabling the steering column to get displaced towards the front of the vehicle.

A tension member 13 is disposed between the brackets 12, 12. The tension member 13 is a member taking substantially an annular shape in its assembled state. The tension member 13 can be divided at its center into two parts, i.e., a left-half tension member 13a and a right-half tension member 13b. To be more specific, two pieces of bolts 14, 14 inserted through a screw hole 13c formed in the left-half tension member 13a and a screw hole 13d formed in the right-half tension member 13b, are fastened, thereby assembling the left-half tension member 13a and the right-half tension member 13b together. The tension member 13 can be thus acquired. Based on this construction, the left- and right-half tension members 13a, 13b remain separated before being mounted in the real car and made integral with each other when mounted in the real car by use of a bolt 14, thereby enabling the assembly to be more facilitated.

A cylindrical inner column 11 is disposed inwardly of the tension member 13. A steering shaft S is inserted through within the inner column 11 and is rotatably supported via an unillustrated bearing within the inner column 11.

Telescopic grooves 11a are, as illustrated in FIG. 2, formed as elongate holes in parallel with the axis of the steering shaft S on both sides of the inner column 11. On the other hand, the bracket 12 is formed with a tilt groove 12a serving as part of a circular arc depicted when the steering shaft S is tilted about a pivotal motion point P, and, in the assembled state, the telescopic groove 11a and the tilt groove 12a are partly overlapped with each other as viewed in the direction shown in FIG. 2. A fixing member 16 is so inserted from the left side in FIG. 1 as to penetrate the tilt groove 12a, while a fixing member 17 is inserted from the right side in FIG. 1. Axes of the fixing members 16, 17 substantially intersect (actually intersect or extend in the vicinity of) the axis of the steering shaft S.

The fixing member 16 includes a disc-like head portion 16a larger than a width of the tilt groove 12 on the left side in FIG. 1, an angular-pole-like tilt guided portion 16b engaging with and thus guided along within the tilt groove 12a, a male screw portion 16c screwed into a screw through-hole 13e formed in the left-half tension member 13a of the tension member 13, and an angular-pole-like telescopic guided portion 16d engaging with and thus guided along within the telescopic groove on the left side in FIG. 1.

On the other hand, the fixing member 17 includes a head portion 17a, an elongate tilt guided portion 17b taking a cylindrical shape and having a diametrical dimension slightly smaller than a width of the tilt groove 12a, a male screw portion 17c screwed into a screw through-hole 13f formed in the right-half tension member 13b of the tension member 13, and an angular-pole-like telescopic guided portion 17d engaging with and thus guided along within the telescopic groove 11a on the right side in FIG. 1. Note that telescopic guided portions 16d, 17d configure protruded portions engaging with the telescopic grooves 11a and extending inwards in the diametrical directions.

Provided along a periphery of the guided portion 17b of the fixing member 17 are a first cam member 18 that partly engages with the telescopic groove 11a and is therefore incapable of rotating, a second cam member 19 disposed adjacent to the first cam member 18, attached to a side end portion of a lever L and rotatable together with the lever L, and a bearing 20 interposed in between and held by the head portion 17a and the side end portion of the lever L. It should be noted that the first cam member 18, the second cam member 19 and the lever L constitute a displacing member.

An outer column 21 has a cylindrical portion 21a, a pair of arm portions 21b (which are car body fitting portions of which only one is shown in FIG. 3) extending from the cylindrical portion 21a towards the left in FIG. 2, and a pair of flange portions 21c, 21d disposed at some interval in the axis-direction shown in FIG. 3 along an outer periphery of the right side end portion of the cylindrical portion 21a in FIG. 2. The cylindrical portion 21a embraces the inner column 11, and a side end portion of the arm portion 21b so supported by a support member 22 on the unillustrated car body as to be capable of swinging about a pivotal support point 0. The tension member 13 is disposed between the flange portions 21c, 21d serving as a pressing portion. Note that the cylindrical portion 21a is formed with a pair of slits 21e (appearing more exaggerated than in reality) in positions apart through 90 degrees from the fixing members 16, 17 so as to split the flange portions 21c, 21d from the right side ends thereof as shown in FIGS. 3 and 4.

As illustrated in FIG. 2, a coil spring W is disposed between the bracket 12 and the outer column 21. The coil spring W biases the outer column 21 upwards in FIG. 2 towards the bracket 12, thereby canceling a self-weight of the unillustrated steering wheel, etc. attached to the right side end of the steering shaft S.

Next, an adjusting operation of the steering apparatus in the first embodiment will be explained. When an operator (driver) rotates the lever L in a fastening direction up to a position depicted by a solid line in FIG. 2, the protruded portions of the first cam member 18 and the second cam member 19 in the fixing member 17 engage with each other in FIG. 1, thereby generating a force acting in such directions as to separate from each other. At this time, the bracket 12 on the right side in FIG. 1, which is pressed by the first cam member 18, gets displaced to the left. While on the other hand, the fixing member 17 pressed rightwards by the second cam member 19 displaces the tension member 13 towards the right. The tension member 13, with this displacement thereof, pushes the side portions of the flange portions 21c, 21d of the outer column 21 against both sides of the tilt grooves 12a of the brackets 12, thus giving proper pressing forces. The outer column 21 is thereby fixed to the brackets 12, with the result that tilt-directional displacement of the inner column 11 is blocked.

On the other hand, when the bracket 12 on the right side in FIG. 1, which has been pressed by the first cam member 18, gets displaced to the left as the lever L is rotated in the fastening direction, this bracket 12 abuts on right-half portions of the flange portions 21c, 21d and similarly displaces these portions to the left, thereby applying a pressing force to an outer peripheral surface of the inner column 11. Further, the force given by the tension member 13 is transferred to the fixing member 16 disposed on the opposite side, whereby the bracket 12 on the left side in FIG. 1, which has been pressed by this force, gets displaced to the right. The left-side bracket 12, when getting displaced to the right, abuts on the left-half portions of the flange portions 21c, 21d and similarly displaces these portions to the right, thereby applying the pressing force to the outer peripheral surface of the inner column 11.

According to the first embodiment, the two brackets 12 have substantially the same configuration and the plate thickness, i.e., have substantially the same flexural elastic coefficient (namely, the same rigidity). Hence, the brackets 12 receive the forces in such directions as to have proximity to each other and make substantially the same amount of displacement. Then, the inner column 11 receives the pressing forces from both of the right and left sides in FIG. 1 via the flange portions 21c, 21d, and is fixed so that the center of the inner column 11 is coincident with such a position as to halve a distance between the brackets 12, 12. With this arrangement, an axis deviation of the steering shaft S can be restrained while being capable of blocking the displacement in a telescoping direction. Note that the first embodiment takes the construction, wherein as the slits 21e are formed upwardly and downwardly of the outer column 21, the rigidity of the outer column 21 decreases, and the flange portions 21c, 21d are easy to get displaced in the direction towards the inner column 11.

A requirement for attaining the operations described above is that an increment quantity $\Delta D$ of a distance D from the head portion 17a of the fixing member 17 to the side end surface of the bracket 12 when fastening the lever L should be, as shown in FIG. 1, larger than a value obtained by subtracting a width B of the tension member 13 from an interval C between the brackets 12, 12 in a free state (wherein, the above value is a sum of a gap F between the right-side bracket 12 in FIG. 1 and the tension member 13 and of a gap F' between the left-side bracket 12 and the tension member 12). Namely, the requirement is given by $\Delta D > (F+F')$. The increment quantity $\Delta D$ can be adjusted by changing heights of the ride-on protruded portions (unillustrated) of the first cam member 18 and the second cam member 19.

By contrast, when the operator (driver) rotates the lever L in a slackening direction down to a position depicted by a two-dotted chain line in FIG. 2, the protruded portions of the first cam member 18 and the second cam member 19 disengage from each other in FIG. 1, resulting in a return to the initial distance D from the head portion 17a of the fixing member 17 to the side end surface of the bracket 12. This causes the bracket 12 to separate away from the tension member 13 with the result that the outer column 21 comes to a free state with respect to the bracket 12. Therefore, the tilt guided portions 16b, 17b of the fixing members 16, 17 are displaced while being guided along the tilt grooves 12a, 12a of the brackets 12, 12, or alternatively the telescopic guided portions 16d, 17d are displaced while being guided along the telescopic grooves 11a of the inner column 11, whereby the adjustment in the tilting direction and in the telescoping direction can be arbitrarily made.

It is required for attaining the operations described above that the interval C between the brackets 12 in the free state be larger than the width B of the tension member 12. Namely, the requirement is given such as C>B. It is to be noted that a value of (C−B) is changed by varying a screw-in quantity of the fixing member into the tension member 13, and it is therefore possible to adjust the pressing force between the bracket 12 and the tension member 13 when fastening the lever L.

Figure 5:
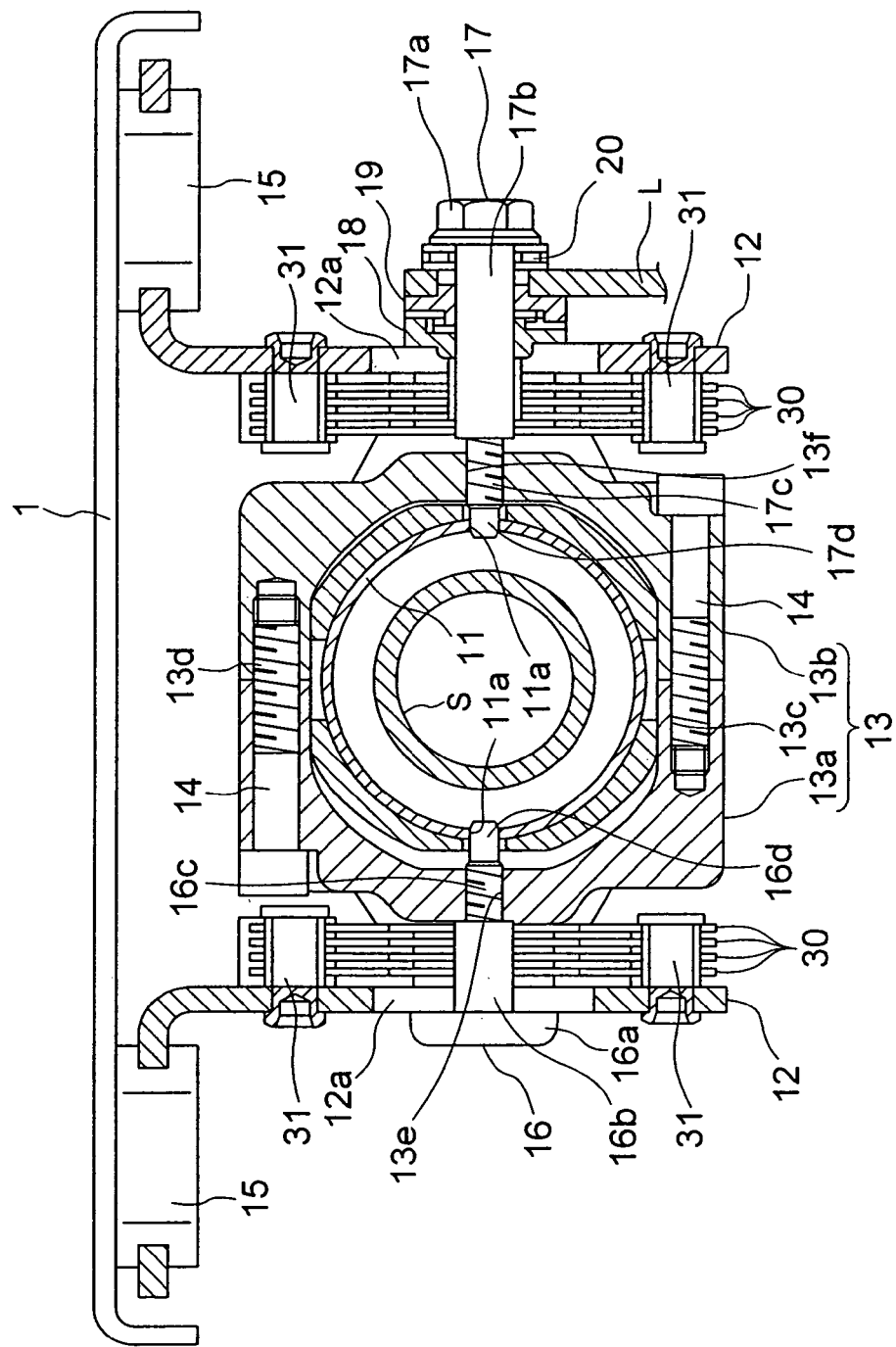
FIG. 5 is a cross-sectional view of the tilt/telescopic type steering apparatus according to a second embodiment of the present invention.
Figure 6:
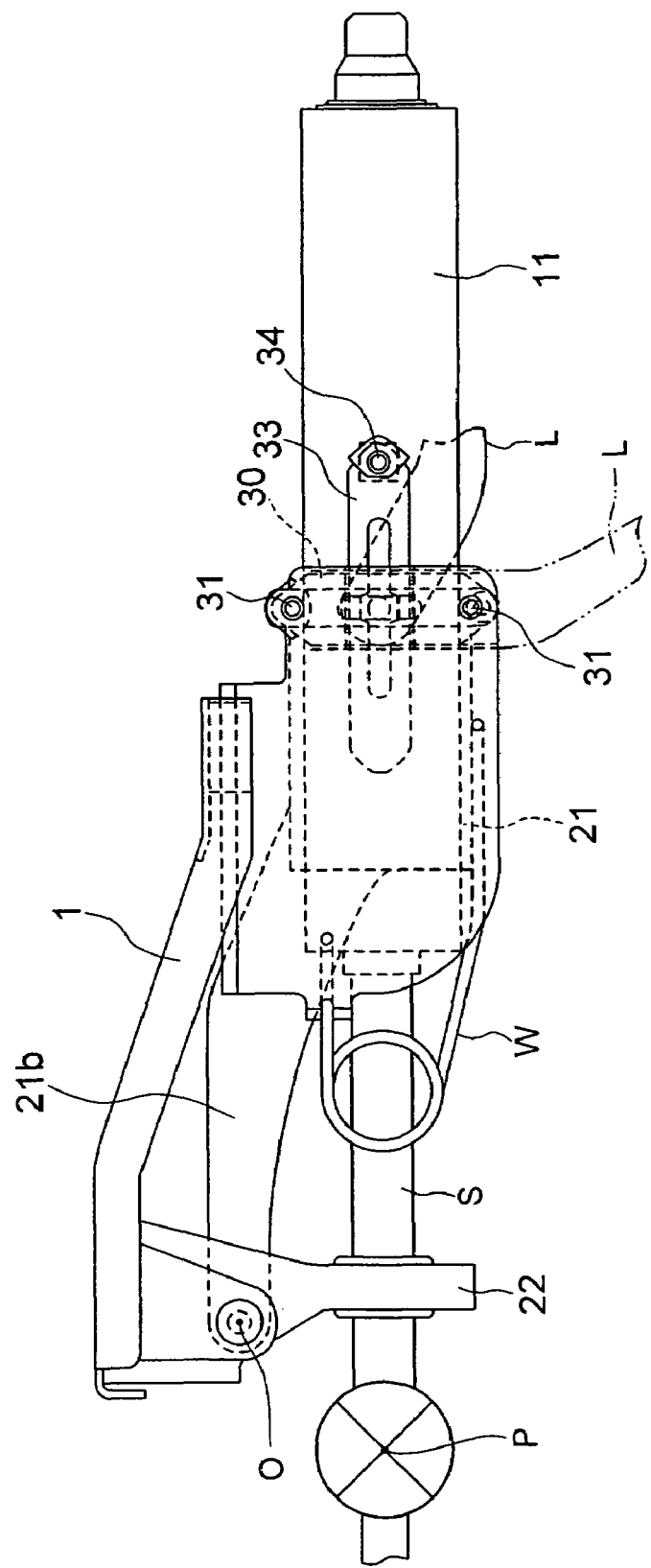
FIG. 6 is a side view of the steering apparatus shown in FIG. 5.
Figure 7:
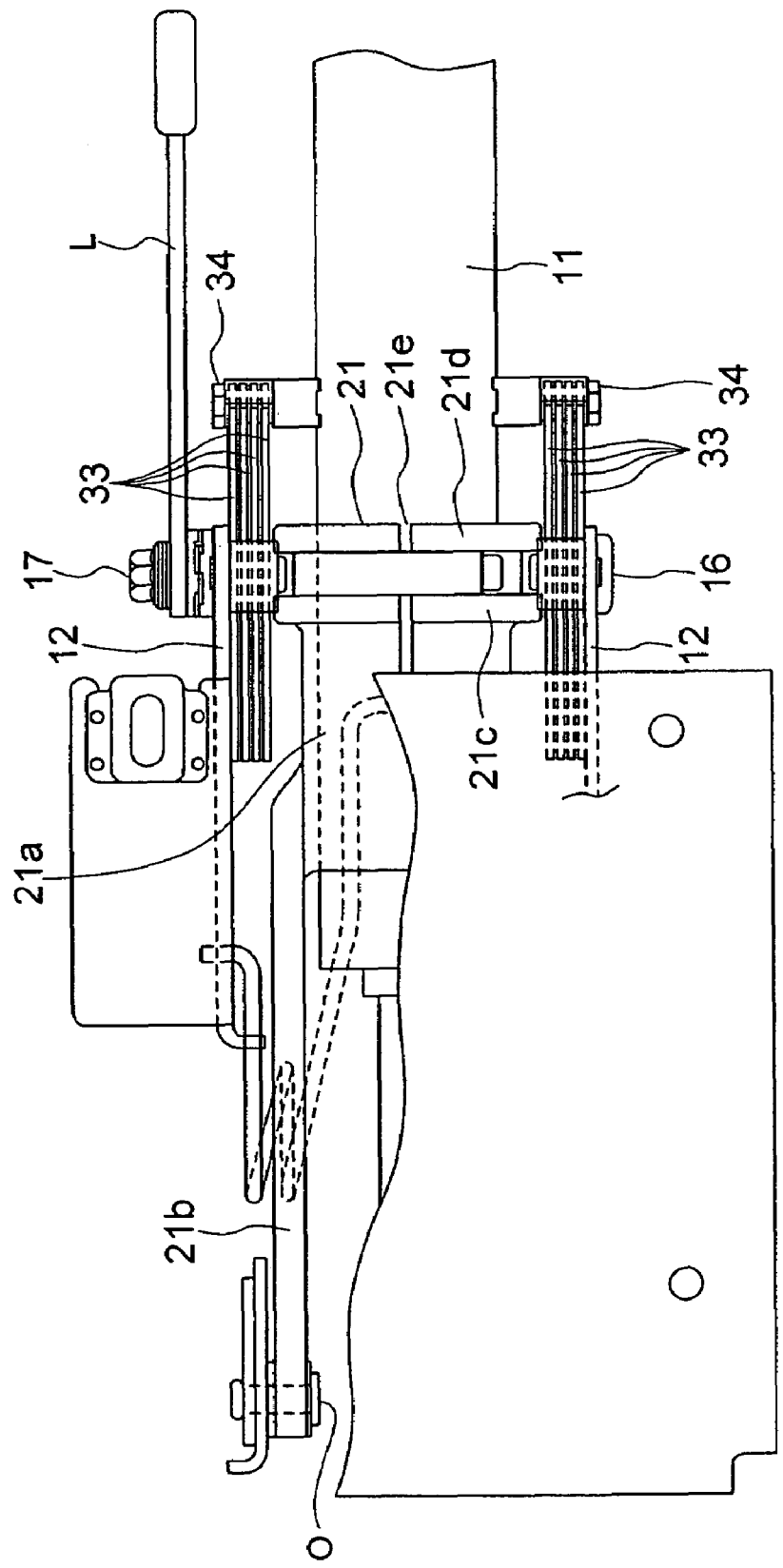
FIG. 7 is a top view of the steering apparatus shown in FIG. 5.

FIG. 5 is a cross-sectional view of the tilt/telescopic type steering apparatus according to a second embodiment of the present invention. FIG. 6 is a side view of the steering apparatus shown in FIG. 5. FIG. 7 is a top view of the steering apparatus shown in FIG. 5. It is only a different point of the second embodiment from the first embodiment shown in FIGS. 1 through 4 to provide an additional construction, and hence common components other than this difference are marked with the same numerals and symbols, of which the repetitive explanations are herein omitted.

To give a more specific description about the different point, a plurality (which is herein represented by four pieces) of friction plates 30 receiving penetration of one of the fixing members 16, 17 and extending in vertical directions in FIG. 5 are, as shown in FIGS. 6 and 7, disposed between the flange portions of the outer column 21 and the two brackets 12. As illustrated in FIG. 5, the four friction plates 30 are attached to the brackets 12 by use of two pieces of caulking pins 31 but are displaceable in an axis-direction of the caulking pin 31.

Further, referring to FIG. 7, similarly a plurality (which is herein represented by four pieces) of friction plates 33 receiving penetration of one of the fixing members 16, 17 and extending in horizontal directions in FIG. 7 are disposed crosswise over the individual friction plates 30 between the flange portions of the outer column 21 and the two brackets 12. Each set of four friction plates 33 is attached to each of both sides of the inner column 11 through a piece of pin 34 but is displaceable in an axis-direction of the pin 34.

To describe an adjusting operation of the steering apparatus in the second embodiment, referring to FIG. 5, when the operator (driver) rotates the lever L in the fastening direction, the protruded portions of the first cam member 18 and the second cam member 19 engage with each other, thereby generating forces in such directions as to separate from each other. At this time, the bracket 12 on the right side in FIG. 1, which is pressed by the first cam member 18, gets displaced to the left. While on the other hand, the fixing member 17 pressed rightwards by the second cam member 19 displaces the tension member 13 towards the right. The tension member 13, with this displacement thereof, pushes the flange portions 21c, 21d of the outer column 21 against peripheries of the tilt grooves 12a of the brackets 12 through the friction plates 30, 33, thus giving proper pressing forces. The outer column 21 is thereby fixed to the brackets 12 with the aide of the tremendous frictional forces of the friction plates 30 and 33, with the result that tilt-directional displacement of the inner column 11 is blocked.

On the other hand, when the bracket 12 on the right side in FIG. 1, which has been pressed by the first cam member 18, gets displaced to the left as the lever L is rotated in the fastening direction, this bracket 12 abuts on right-half portions of the flange portions 21c, 21d via the friction plates 30, 33 and similarly displaces these portions to the left, thereby applying a pressing force to an outer peripheral surface of the inner column 11. Further, the force given by the tension member 13 is transferred to the fixing member 16 disposed on the opposite side, whereby the bracket 12 on the left side in FIG. 1, which has been pressed by this force, gets displaced to the right. The left-side bracket 12, when getting displaced to the right, abuts on the left-half portions of the flange portions 21c, 21d via the friction plates 30, 33 and similarly displaces these portions to the right, thereby applying the pressing force to the outer peripheral surface of the inner column 11.

Consequently, the tremendous frictional forces occur on the friction plates 30, 33. Namely, according to the second embodiment, the force of holding the outer column 21 can be augmented by using the friction plates 30, 33 more than in the first embodiment discussed above.

Figure 8:
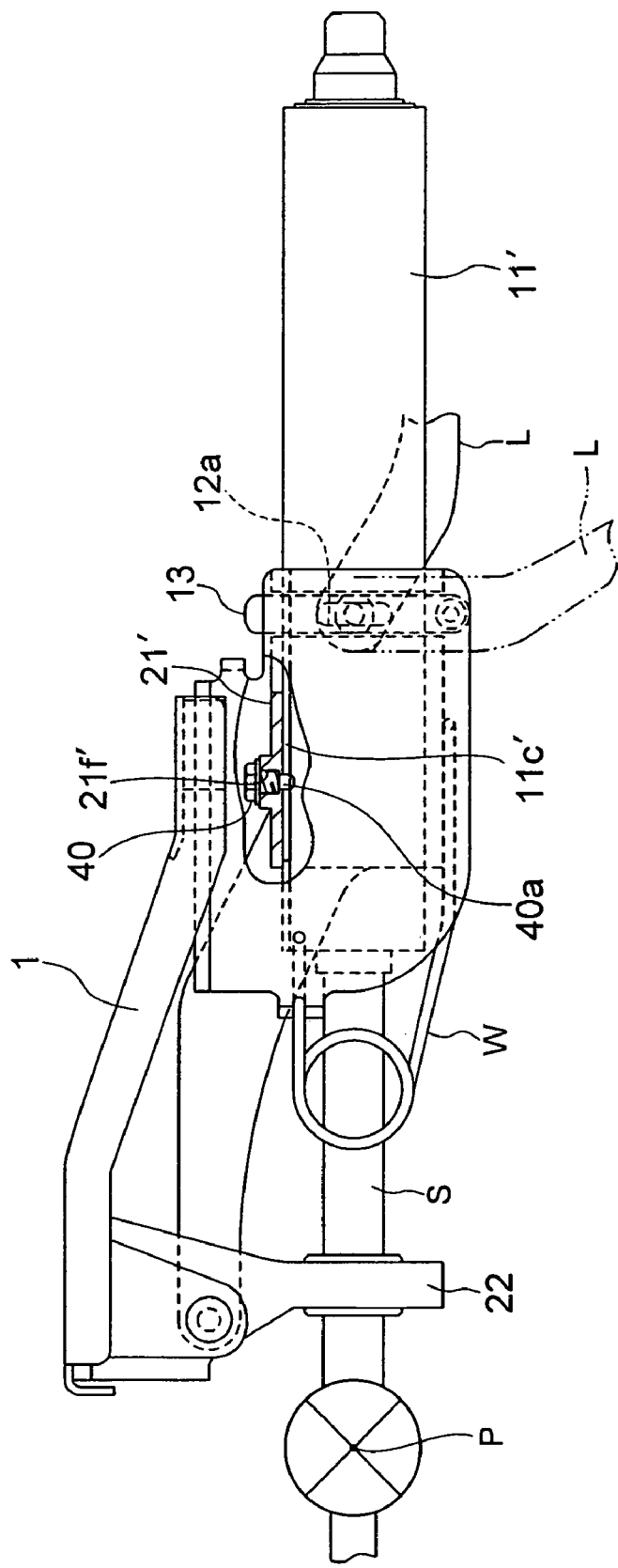
FIG. 8 is a partially sectional side view of a tilt type steering apparatus according to a third embodiment of the present invention.
Figure 9:
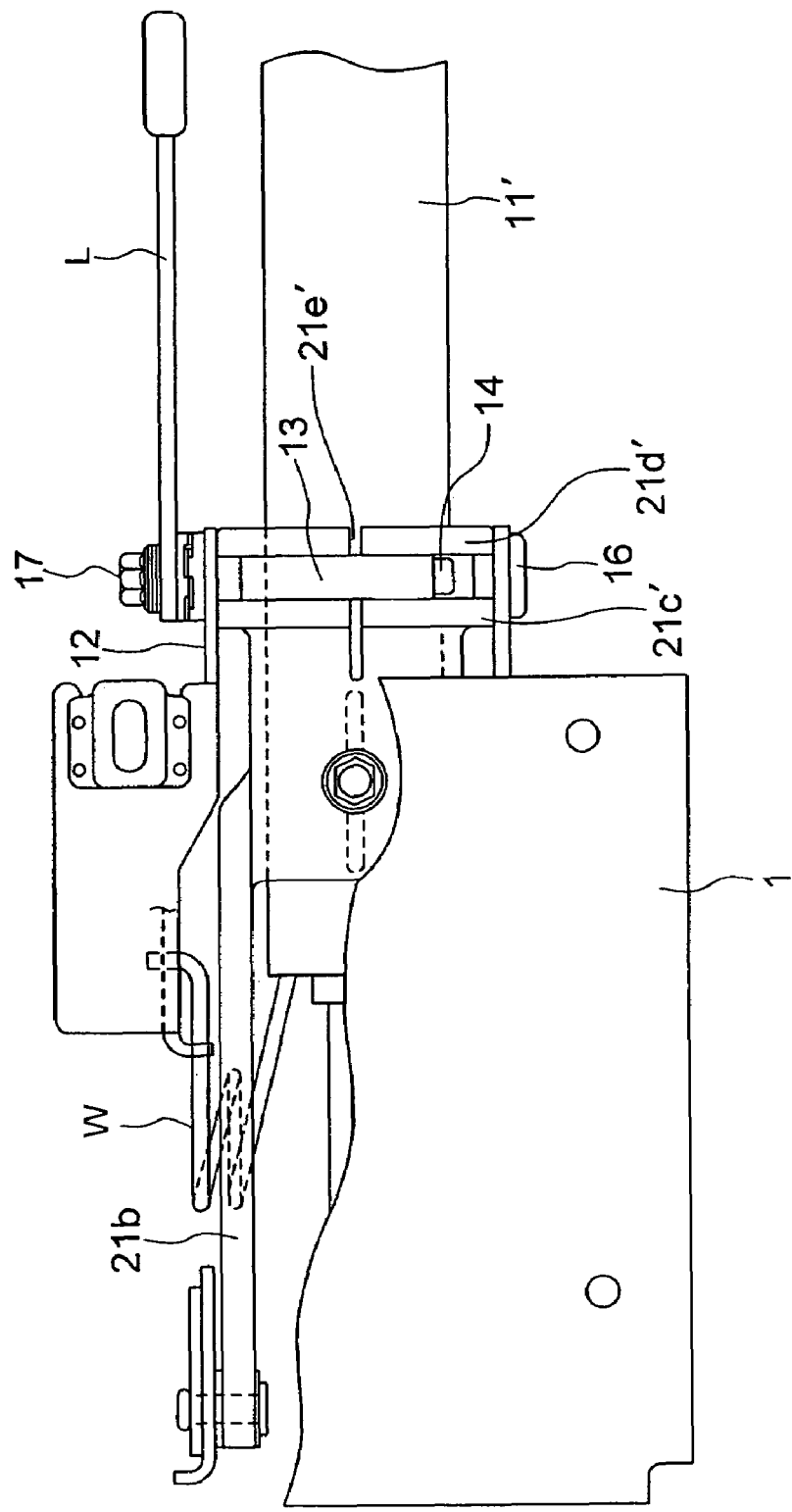
FIG. 9 is a top view of the steering apparatus shown in FIG. 8.

FIG. 8 is a partially sectional side view of the tilt/telescopic type steering apparatus according to a third embodiment of the present invention. FIG. 9 is a top view of the steering apparatus shown in FIG. 8. It is only a different point of the third embodiment from the first embodiment illustrated in FIGS. 1 through 4 to omit the telescopic (axis-directional) adjusting function, and hence common components other than this difference are marked with the same numerals and symbols, of which the repetitive explanations are herein omitted.

To give a more specific description about the different point, an outer column 21' is, as shown in FIG. 8, formed with a screw hole 21f in its upper portion. A pin-attached bolt 40 is screwed into this screw hole 21f from an outer peripheral side thereof. The pin-attached bolt 40 is formed with a pin portion 40a at its front side end. The pin portion 40a protrudes inwards in a radial direction from an inner peripheral surface of the outer column 21', and engages with an elongate hole 11c' formed in an upper portion of the inner column 11'. Note that the inner column 11' has telescopic holes formed along the peripheries of the fixing members 16, 17 in the third embodiment.

According to the third embodiment, the outer column 21' is provided with the pin-attached bolt 40 as the protruded portion extending in the radial direction, and the pin portion 40a engages with the elongate hole 11c'. With this arrangement, when the inner column 11' and the outer column 21' get displaced in their axis-directions, the pin-attached bolt 40 abuts on (engages with) the side end portion of the elongate hole 11c' of the inner column 11' and thus functions as a telescoping stopper for blocking further displacements thereof. Note that the inner column 11' may be formed with a telescoping stopper as a protruded portion, and relative displacements may be blocked by abutting on (engaging with) the outer column 21'.

Figure 10:
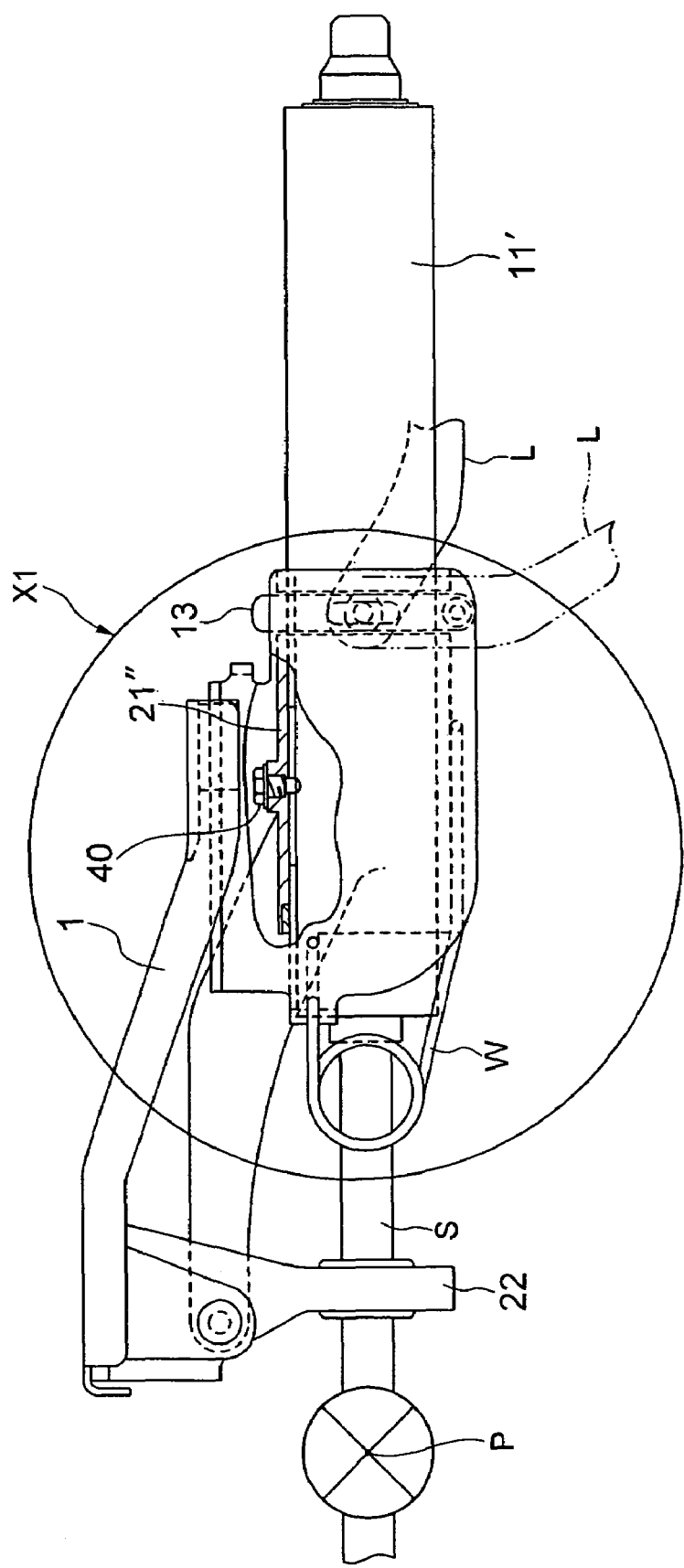
FIG. 10 is a partially sectional side view of the tilt type steering apparatus according to a fourth embodiment of the present invention.
Figure 11:
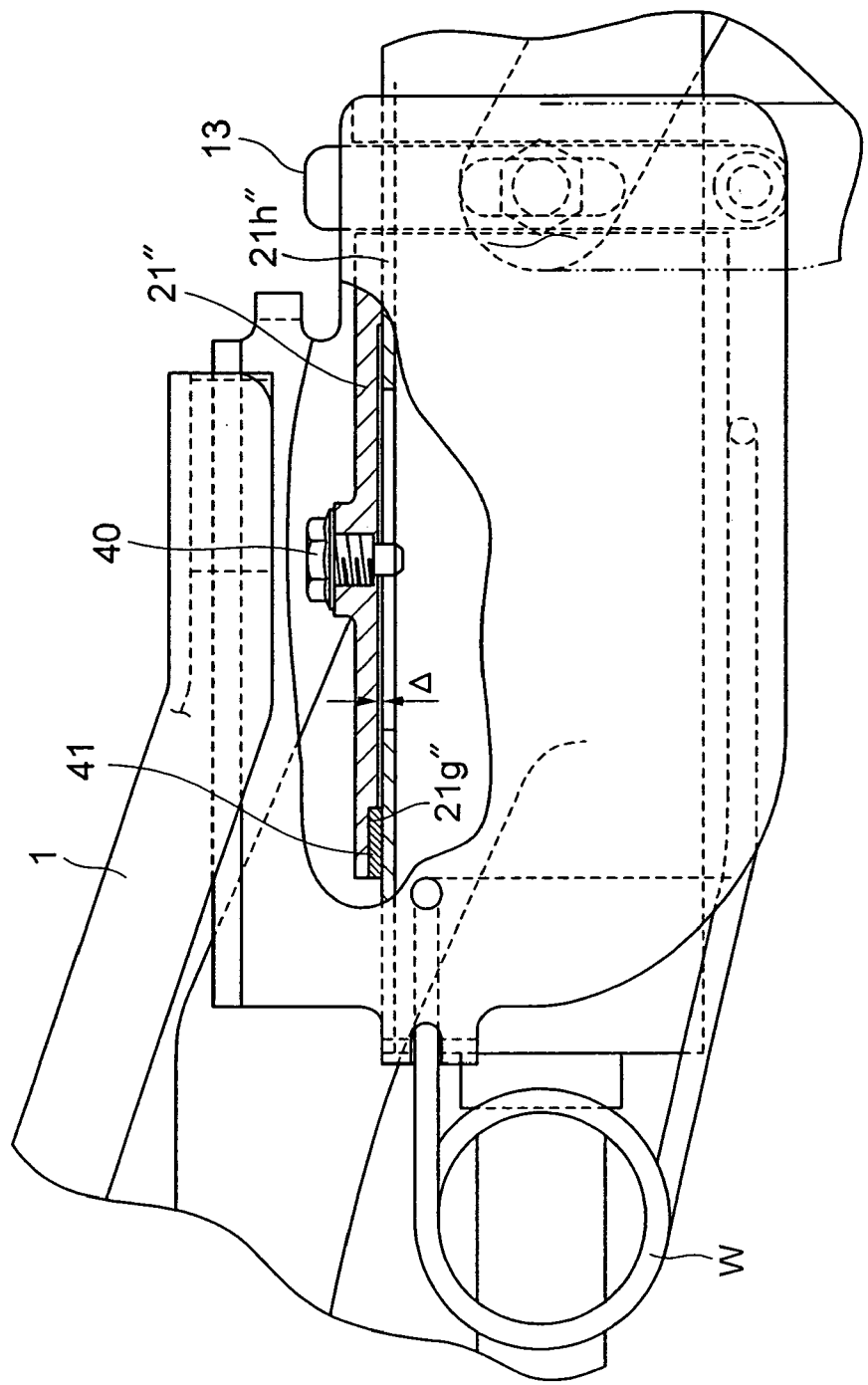
FIG. 11 is an enlarged view of a portion indicated by an arrowhead XI in a construction shown in FIG. 10.

FIG. 10 is a partially sectional side view of the tilt/telescopic type steering apparatus according to a fourth embodiment of the present invention. FIG. 11 is an enlarged view of a portion indicated by an arrowhead XI in a construction shown in FIG. 10. In the fourth embodiment also, the components common to those in the first through third embodiments illustrated in FIGS. 1 through 9 are marked with the same numerals and symbols, of which the repetitive explanations are herein omitted.

Referring to FIG. 11, a diameter-reduced portion 21h" of which a diameter is slightly reduced is formed in an inner peripheral surface in the vicinity of a right side end, as viewed in FIG. 11, of an outer column 21". Further, a diameter-expanded portion 21g" of which a diameter is slightly expanded is formed in the inner peripheral surface in the vicinity of a left side end as viewed in FIG. 11. A cylindrical retainer 41 is fitted into and thus disposed in the diameter-expanded portion 21g". A length of the retainer 41 in the axis-direction is substantially the same as a length of the diameter-expanded portion 21g" in the axis-direction. An inside diameter of an inner peripheral surface of the retainer 41 is substantially equal to an inside diameter of an inner peripheral surface of the diameter-reduced portion 21h" but is smaller than an inside diameter of an inner peripheral surface throughout the outer column 21" excluding the diameter-reduced portion 21h".

Accordingly, in a state where an outer peripheral surface of the inner column 11' abuts on the inner peripheral surface of the retainer 41 (which is made of, preferably, a material exhibiting excellency in terms of slidability), a gap Δ is produced throughout between the outer peripheral surface of the inner column 11' and the inner peripheral surface of the outer column 21" other than the diameter-reduced portion 21h". Thus, the outer peripheral surface of the inner column 11' is retained only by the retainer 41 and the diameter-reduced portion 21h". It is therefore possible to largely decrease a slide resistance when the inner column 11' moves relatively to the outer column 21'.

Moreover, considering a case in which the outer column 21" and the inner column 11' relatively slide on each other, there is needed an accurate design work about an inside diameter of the outer column 21" and an outside diameter of the inner column 11', which slide on each other. According to a construction that the entire inner and outer peripheral surfaces of the two columns 21" and 11' slide on each other, however, it is difficult to conduct highly accurate dimensional control over the whole thereof. As a result, the slide resistance might increase, and a backlash might occur. By contrast, as in the fourth embodiment, when the outer peripheral surface of the inner column 11' is retained only by the retainer 41 and the diameter-reduced portion 21h", the highly accurate design work about only the sliding portions thereof may suffice, and the dimensional management can be facilitated.

Figure 12:
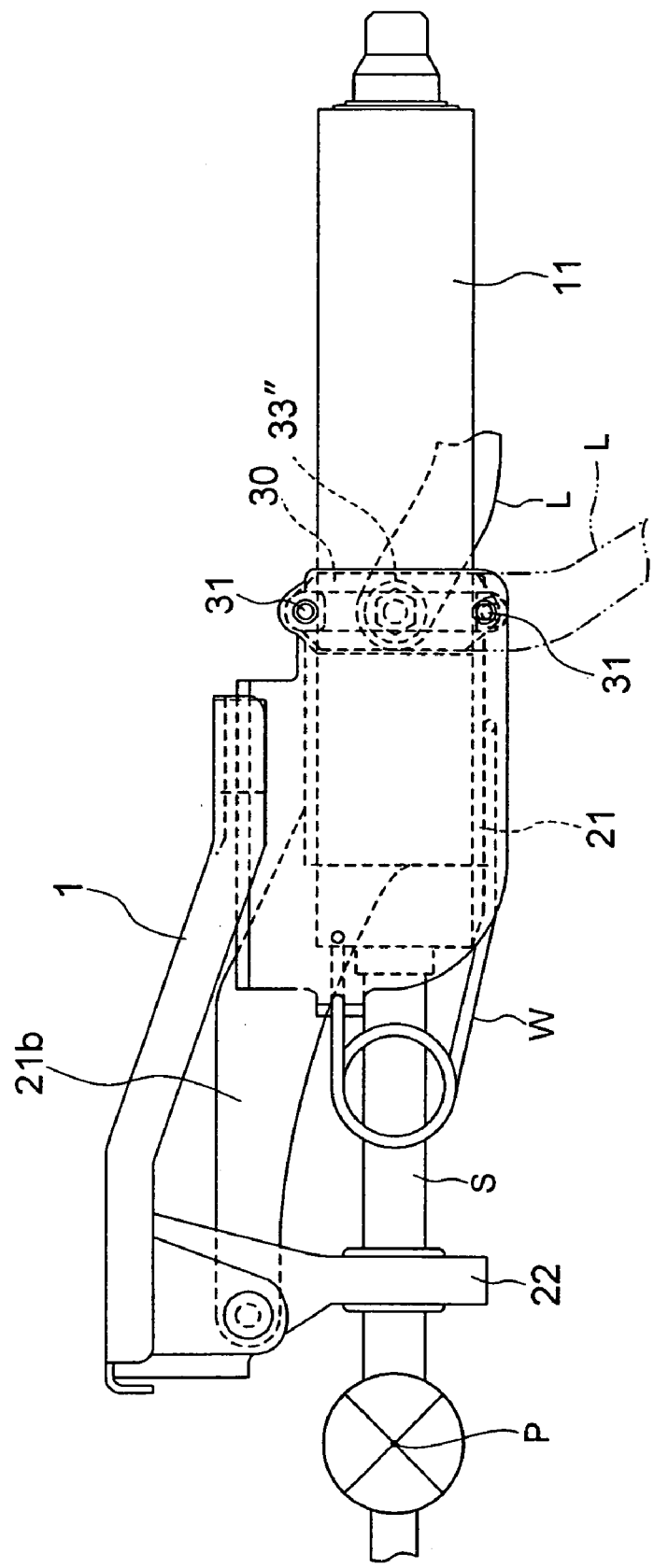
FIG. 12 is a partially sectional side view of the tilt type steering apparatus according to a fifth embodiment of the present invention.
Figure 13:
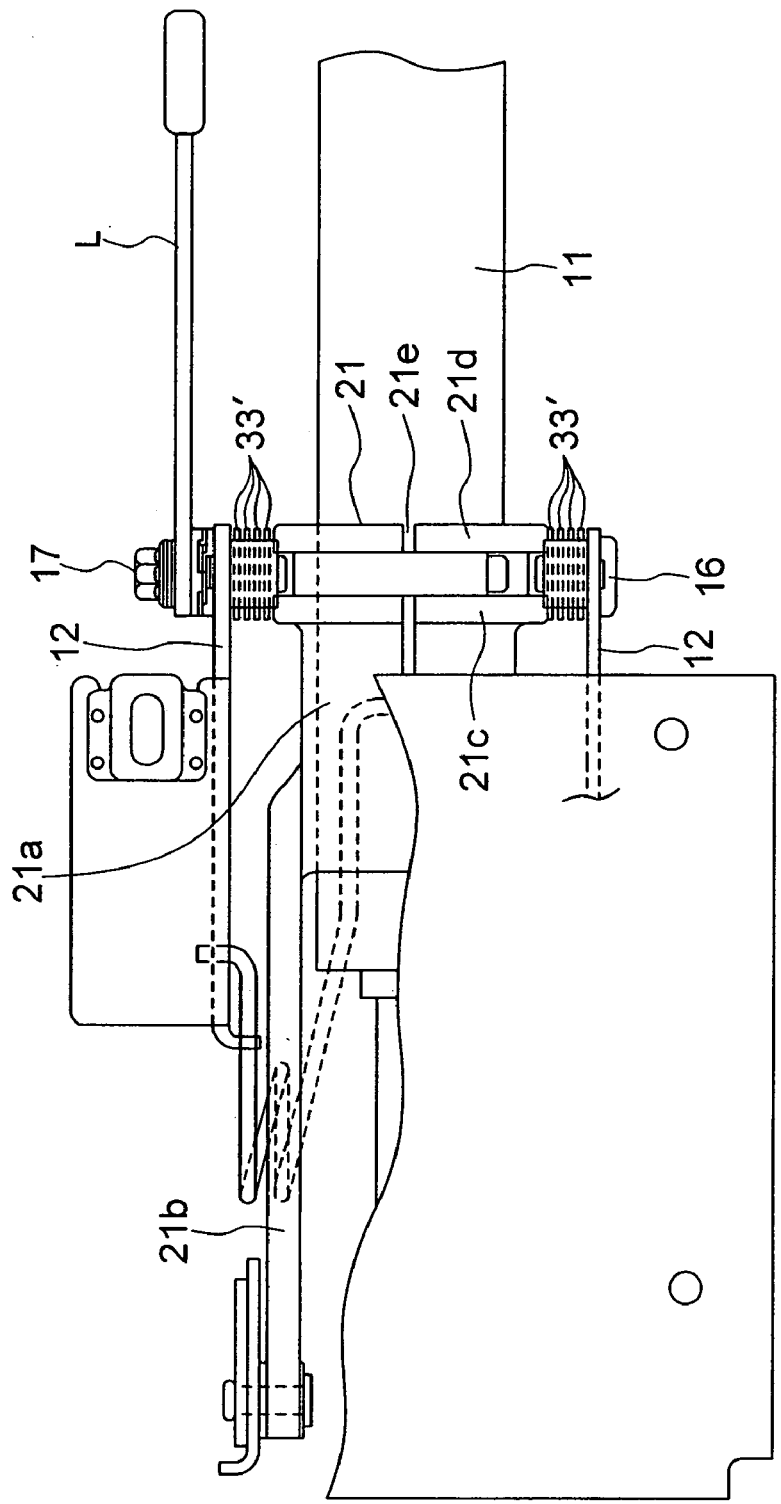
FIG. 13 is a top view of the steering apparatus shown in FIG. 12.

FIG. 12 is a partially sectional side view of the tilt/telescopic type steering apparatus according to a fifth embodiment of the present invention. FIG. 13 is a top view of the steering apparatus shown in FIG. 12. The fifth embodiment has a difference from the second embodiment illustrated in FIGS. 5 through 7 only about a point of employing circular washers 33' as a substitute for the elongate friction plates 33. The common components other than the circular washers are marked with the same numerals and symbols, of which the repetitive explanations are herein omitted. It should be noted that as the friction plates 33 are replaced by the washers 33', the pins 34 are also omitted.

According to the fifth embodiment, in the tilting direction, even if a large load as by the secondary collision is applied due to a large frictional force acting on between the four pieces of friction plates 30 and the washers 33' disposed crosswise over these plates, the outer column 21 can be surely held. While in the telescoping direction, none of the friction plates being provided, such a large load is received mainly by the slide resistance between the outer column 21 and the inner column 11, and hence a start-of-movement load can be restrained low. In the case of downsizing the vehicle, an entire length of the column is reduced, wherein it is difficult to ensure a sufficient collapsible stroke. According to the fifth embodiment, when the secondary collision happens, the outer column 21 can be easily slide on the inner column 11 in the telescoping direction. Therefore, even when the column itself is shortened, a merit is that the collapsible stroke can be substantially increased.

Figure 14:
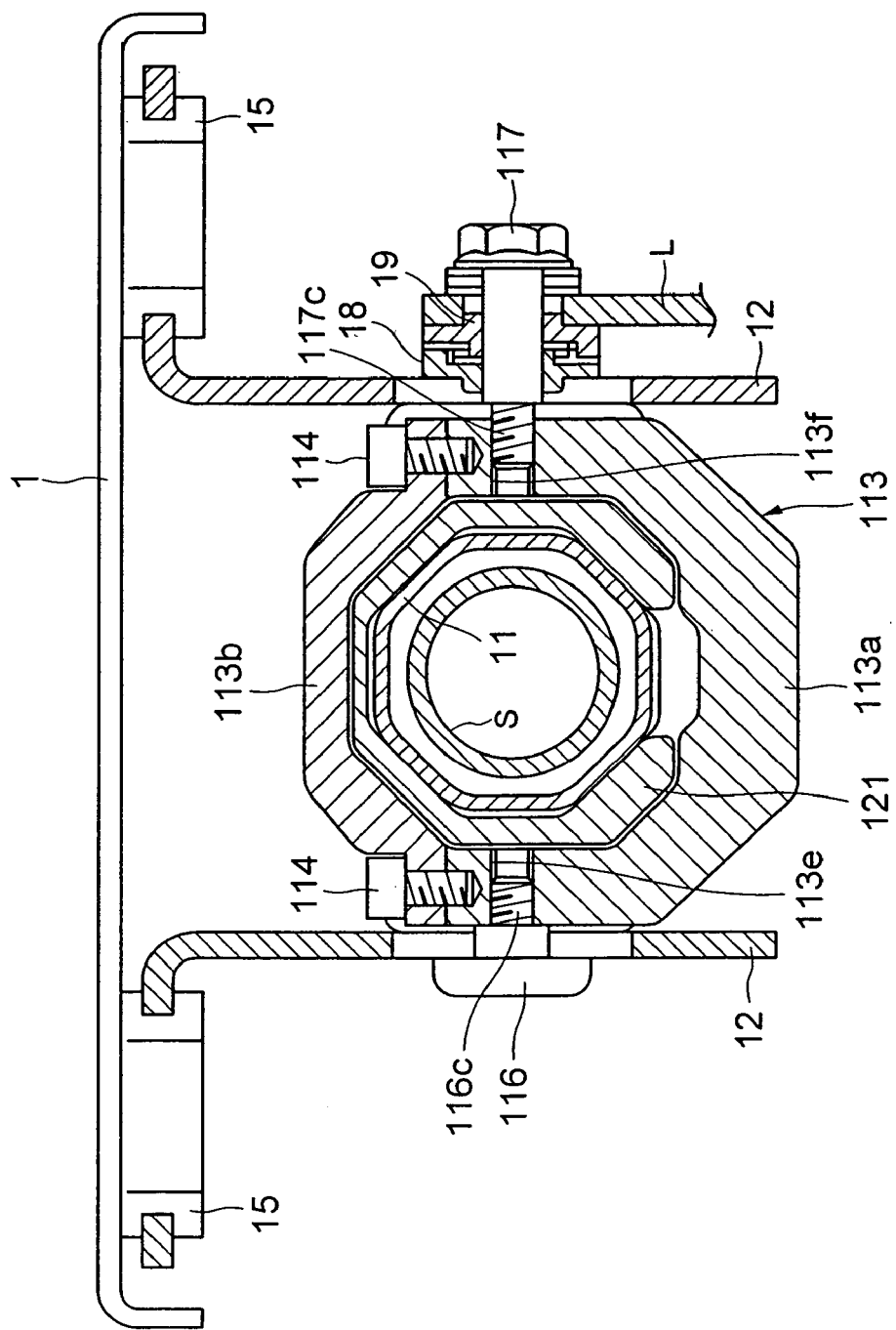
FIG. 14 is a sectional view, similar to FIG. 1, of the tilt type steering apparatus according to a sixth embodiment of the present invention.

FIG. 14 is a sectional view, similar to FIG. 1, of a tilt type steering apparatus according to a sixth embodiment of the present invention. The sixth embodiment is different from the first embodiment shown in FIG. 1 chiefly about a configuration of the tension member, etc., and therefore the common components are marked with the same numerals and symbols, of which the repetitive explanations are herein omitted.

Referring to FIG. 14, a tension member 113 is constructed of a lower side portion 113a taking a U-shape in section and an upper side portion 113b fastened by bolts 114 that cover open areas thereof. Male screw portions 116c, 117c of fixing members 116, 117 are screwed into screw holes 113e, 113f formed in the lower side portion 113a, whereby the tension member 113 is secured to between the pair of brackets 12. According to the sixth embodiment, the respective bolts 114 can be fastened in the same direction (from above), and hence assembling characteristics are more advantageous than in the embodiments discussed above.

An interior space, which is configured by the lower side portion 113a and the upper side portion 113b of the tension member 113, takes substantially an octagonal shape and accommodates an outer column 121 assuming substantially a C-shape in section, corresponding thereto. The outer column 121 is made of an aluminum material (or a magnesium material) by die casting and can therefore be, as illustrated in FIG. 14, in an arbitrary configuration having an open area at its lower portion and having a large wall thickness on the lower side.

A cylindrical inner column 111 taking substantially an octagonal shape in section is disposed inwardly of the outer column 121. In an assembled state, the inner column 111 and the outer column 121, which are non-cylindrical in their sectional shapes, engage with each other, so that the inner column 111 can be restrained from rotating about the axis. Note that the section of the inner column 111 is not limited to the octagonal shape and may take polygonal shapes other the octagon.

Figure 15:
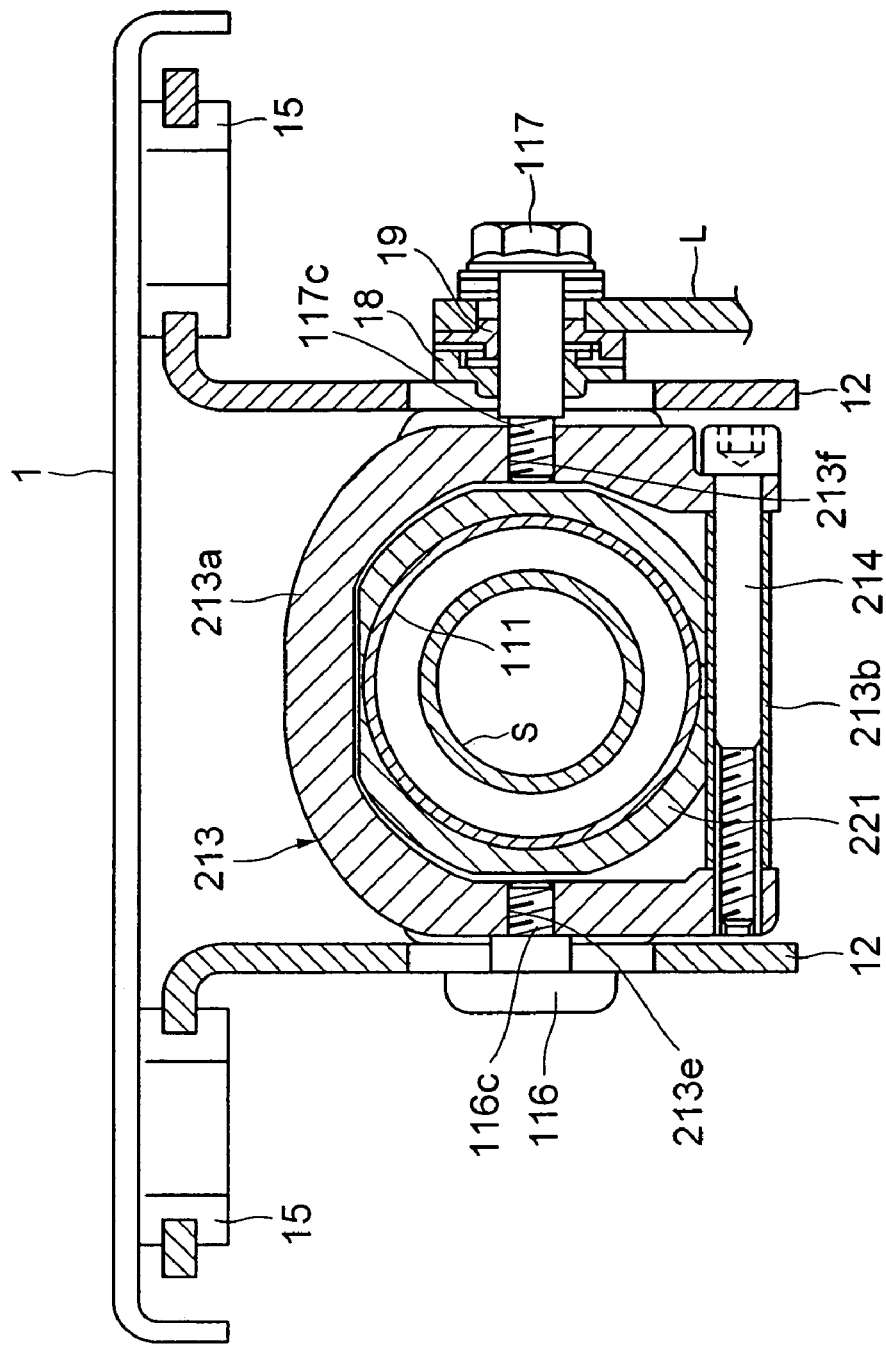
FIG. 15 is a sectional view, similar to FIG. 14, of the tilt type steering apparatus according to a seventh embodiment of the present invention.

FIG. 15 is a sectional view, similar to FIG. 14, of the tilt type steering apparatus according to a seventh embodiment of the present invention. The seventh embodiment is different from the sixth embodiment shown in FIG. 14 mainly about a configuration of the tension member, etc., and therefore the common components are marked with the same numerals and symbols, of which the repetitive explanations are herein omitted.

In the seventh embodiment, a tension member 213 is constructed of a main body 213a, of which a lower portion is open, taking an inverted U-shape in section, and a tube 213b bridged between lower side ends of both-sided walls of the main body 213a, and fixed to the main body 213a by a bolt 214 inserted through within this tube 213b. The male screw portions 116c, 117c of the fixing members 116, 117 are screwed into screw holes 213e, 213f formed in the main body 213a, whereby the tension member 213 is secured to between the pair of brackets 12. There may suffice a less number of parts than in the sixth embodiment shown in FIG. 14, and the bolt 214 may involve the use of a standard bolt. Further, the tube 213b can be manufactured simply by cutting an annular tube to a predetermined length, thereby attaining a lower-cost scheme. Note that tube 213b may be manufactured by rounding a plate material.

An annular-tube-like outer column 221 with its lowermost portion notched in the axis-direction, is disposed in an interior of the tension member 213. The outer column 221, of which an uppermost portion is small in its wall thickness and of which the lowermost portion is notched, is therefore capable of easily deforming in a diameter reducing direction. The annular-tube-like inner column 111 is disposed within the outer column 221.

Figure 16:
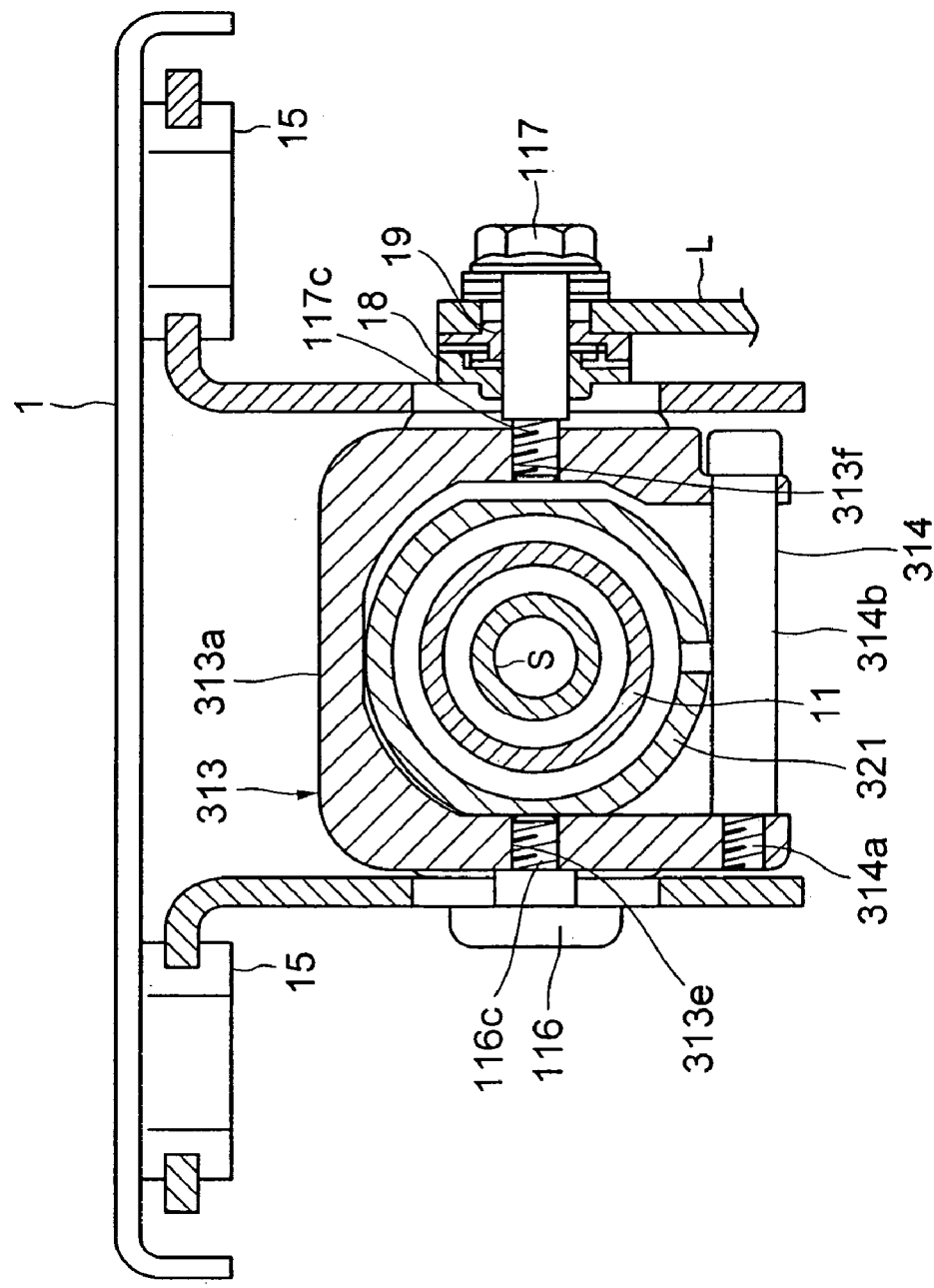
FIG. 16 is a sectional view, similar to FIG. 15, of the tilt type steering apparatus according to an eighth embodiment of the present invention.

FIG. 16 is a sectional view, similar to FIG. 15, of the tilt type steering apparatus according to an eighth embodiment of the present invention. The eighth embodiment is different from the seventh embodiment shown in FIG. 15 mainly about a configuration of the tension member, etc., and therefore the common components are marked with the same numerals and symbols, of which the repetitive explanations are herein omitted.

In the eighth embodiment, a tension member 313 is constructed of a main body 313a, of which a lower portion is open, taking an inverted U-shape in section, and a bolt 314 for connecting both-sided walls of the main body 313a. The bolt 314 includes a screw portion 314a screwed into one side wall (on the left side in FIG. 16), and a thick rod portion 314b having a stepped portion contiguous to the screw portion 314a. According to the eighth embodiment, the bolt 314 itself structures part of the tension member 313. As the stepped portion of the thick rod portion 314b abuts on the side wall of the main body 313a, an interval between the walls on both sides becomes fixed by fastening the bolt 314. Because of having no necessity of using the tube as needed for the seventh embodiment in FIG. 15, a larger number of parts can be reduced. In the eighth embodiment discussed above, the tension member may be formed of a sintered material, a drawn material, a cold forged material, a deformed wire material, a thick plate material, and so on.

The present invention has been explained in depth so far by way of the embodiments. The present invention should not, however, be construed as limited to the embodiments discussed above and can be, as a matter of course, modified and improved properly within the range that does not spoil the gist of the invention. For example, if teeth meshing with each other at every predetermined angle are formed on face-to-face surfaces of the brackets 12 and of the flange portions 21c, 21d, when fastening the lever L, the retaining force can be further increased.

What is claimed is:

1. A steering apparatus for supporting a steering shaft to which a steering wheel is attached so that said steering shaft is displaceable in an axis-direction,
    comprising:
    an inner column for supporting said steering shaft rotatably;
    a pair of brackets constructed to be fitted to a vehicle body and disposed in positions facing each other with respect to an axis of said steering shaft;
    a tension member extending between said pair of brackets;
    two fixing members for fixing said tension member from outside of said pair of brackets;
    a displacement causing member, disposed between one of said brackets and one of said fixing members, for causing a relative displacement between said pair of brackets; and
    an outer column constructed to be held on the vehicle body through a connection between said tension member, said brackets and said fixing members, having a pressing portion between said pair of brackets, of which an outer periphery is engaged with both of said pair of brackets due to relative displacement of said brackets, and having an inner peripheral surface embracing an outer periphery of said inner column,
    wherein said pair of brackets cooperating with said tension member approach one another due to displacement caused by said displacement causing member, a pressing force is thereby applied to said inner column via said pressing portion of said outer column, and said inner column maintains its axis-directional position with respect to said brackets through said outer column,
    wherein an axis of said displacement causing member extends through said outer column, and
    wherein an axis of said steering shaft substantially intersects a straight line that connects centers of said two fixing members.

2. A steering apparatus according to claim 1, wherein said pair of brackets is formed with tilt grooves.

3. A steering apparatus according to claim 1, wherein said outer column includes an integrally-formed vehicle body fitting portion.

4. A steering apparatus according to claim 1, wherein part of said inner column is formed with at least one elongate hole extending in an axis-direction, and an inner peripheral surface of said outer column is formed with a protruded portion engaging with said elongate hole and extending inwards in a radial direction.

5. A steering apparatus according to claim 1, wherein said tension member is constructed of a plurality of parts that form an annular configuration embracing said outer column.

6. A steering apparatus according to claim 1, wherein said tension member is disposed outwardly in the radial direction from said inner column.

7. A steering apparatus according to claim 1, wherein said tension member is disposed between a pair of parts of said pressing portion which are axially spaced on said outer column.

8. A steering apparatus according to claim 1, wherein at least one slit extends from an end of said outer column.

9. A steering apparatus according to claim 1, wherein said displacement causing member includes a pair of cam members, of which protrusions abut one another.

10. A steering apparatus according to claim 1, wherein said displacement causing member includes a lever and a pair of cooperating cams, one of which is rotatable relative to the other in response to rotation of said lever, and wherein said line that connects centers of said two fixing members constitutes a rotational axis of said lever and said one cam.

* * * * *